(12) United States Patent
Fukuman et al.

(10) Patent No.: US 9,594,166 B2
(45) Date of Patent: Mar. 14, 2017

(54) OBJECT DETECTING APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 14/918,304

(22) Filed: Oct. 20, 2015

(65) Prior Publication Data
US 2016/0116589 A1   Apr. 28, 2016

(30) Foreign Application Priority Data

Oct. 22, 2014 (JP) ................................ 2014-215096

(51) Int. Cl.
| | | |
|---|---|---|
| *G01S 15/93* | (2006.01) | |
| *G01S 15/04* | (2006.01) | |
| *G01S 15/46* | (2006.01) | |
| *G01S 15/60* | (2006.01) | |
| *G01S 15/87* | (2006.01) | |

(52) U.S. Cl.
CPC ............ *G01S 15/931* (2013.01); *G01S 15/46* (2013.01); *G01S 15/878* (2013.01); *G01S 2015/465* (2013.01); *G01S 2015/938* (2013.01)

(58) Field of Classification Search
CPC ....... G01S 15/878; G01S 15/46; G01S 15/931; G01S 2015/465; G01S 2015/938
See application file for complete search history.

(56) References Cited

U.S. PATENT DOCUMENTS

2016/0116589 A1* 4/2016 Fukuman .............. G01S 15/878
367/89

FOREIGN PATENT DOCUMENTS

| CN | 105539437 A | * | 5/2016 | .......... G01S 15/878 |
|---|---|---|---|---|
| DE | 102015219551 A1 | * | 4/2016 | .......... G01S 15/878 |
| JP | 2012-144157 A | | 8/2012 | |
| WO | 2012/095717 A2 | | 7/2012 | |

* cited by examiner

*Primary Examiner* — Daniel Pihulic
(74) *Attorney, Agent, or Firm* — Knobbe, Martens, Olson & Bear, LLP

(57) ABSTRACT

An object detecting apparatus that detects an object using a distance measuring sensor and is mounted in a moving body includes a position calculator that calculates a position of the object relative to the moving body, a speed detector that detects a speed of the moving body, a displacement calculator that calculates an distance moved by the moving body, a relative speed calculator that calculates a relative speed between the moving body and the object, a first determiner that determines whether a position calculation in the position calculator is possible, a second determiner that determines whether the moved distance calculation by the displacement calculator is possible, and an estimator that estimate the position of the object based on a last known position of the object, a last known distance moved by the moving body, or a last known relative speed.

5 Claims, 3 Drawing Sheets

OBJECT DETECTING APPARATUS

CROSS-REFERENCE TO RELATED APPLICATION

This application is based on and claims the benefit of priority from earlier Japanese Patent Application No. 2014-215096 filed Oct. 22, 2014, the description of which is incorporated herein by reference.

TECHNICAL FIELD

The present disclosure relates to an object detecting apparatus that is mounted on a moving body such as a vehicle and detects a position of an object existing around the moving body.

BACKGROUND

Conventionally, it is proposed to detect an object existing in surroundings of a vehicle such as a preceding vehicle, a pedestrian or obstacles by using a distance measuring sensor such as an ultrasonic sensor mounted on the vehicle, and perform a various controls to improve a running safety of the vehicle such as actuating a braking device or notifying a driver based on an object detection result.

The distance measuring sensor has a detection range, and it transmits probe waves, and it is possible to receive a reflected wave reflected by an object within the detection range.

However, a position of the object existing around the vehicle may be outside the detecting range of the distance measuring sensor.

Further, even if the object exists within the detection range, a reflecting direction of the reflected wave changes depending on a shape of the object, and a case that it is impossible to detect the object may temporarily occur.

In this case, when it is assumed that the object does not exist in the surroundings of the vehicle, and the vehicle does not perform an actuation of the braking device, for example, there is a possibility that the vehicle may contact the object depending on the position of the object.

In this regard, there is an object detecting apparatus disclosed in the Japanese Patent Application Laid-Open Publication No. 2012-144157 for estimating the position of the object outside of the detection range of the distance measuring sensor.

In the object detecting apparatus disclosed in the Publication No. 2012-144157, when the position of the object is outside of the detection range of the distance measuring sensor, a distance between the vehicle and the object is estimated based on a previous object location detected by the distance measuring sensor and a distance moved by the vehicle as measured by a wheel speed sensor.

However, in the object detecting apparatus according to the Publication No. 2012-144157, a calculation accuracy of the distance between the vehicle and the object will be lowered when the distance moved by the vehicle is not accurately obtained after the position of the object is no longer detected by the distance measuring sensor.

For example, if the object is a moving object, it is not possible to estimate the distance between the vehicle and the object correctly even if the detection result of the wheel speed sensor is distance-converted.

In other words, it is not possible to accurately comprehend a relative position of the vehicle with respect to the object, and as a result, the calculation accuracy of the distance to the object is lowered.

SUMMARY

An embodiment provides an object detecting apparatus that can properly estimate a position of an object in a case where a position of the object around a moving body cannot be calculated from a detection result of a distance measuring sensor.

An object detecting apparatus that detects an object using a distance measuring sensor and is mounted in a moving body according to an aspect includes a position calculator that calculates a position of the object relative to the moving body based on a detection result of the distance measuring sensor, a speed detector that detects a speed of the moving body, and a displacement calculator that calculates a distance moved by the moving body based on the speed of the moving body that is detected by the speed detector.

The object detecting apparatus further includes a relative speed calculator that calculates a relative speed between the moving body and the object based on the position of the object calculated by the position calculator and the speed of the moving body detected by the speed detector, a first determiner that determines whether a position calculation by the position calculator is possible, and a second determiner that determines whether a moved distance calculation by the displacement calculator is possible.

The object detecting apparatus further includes a first estimator that estimates the position of the object based on a last known position of the object and the distance moved by the moving body calculated by the displacement calculator when the position calculation is determined to be impossible by the first determiner and the moved distance calculation is determined to be possible by the second determiner, and a second estimator that estimates the position of the object based on the last known position of the object and a last known relative speed when the position calculation is determined to be impossible by the first determiner and the moved distance calculation is determined to be impossible by the second determiner.

When a calculation of a distance moved by the moving body based on the speed of the moving body is not properly performed, it becomes difficult to obtain the position of the object in a situation where the position calculation of the object based on the detection result of the distance measuring sensor is impossible.

In this regard, it becomes possible to obtain the position of the object by using a last known relative speed between the moving body and the object even under conditions where the position calculation of the object based on the detection result of the distance measuring sensor is impossible.

As a result, it becomes possible to properly estimate the position of the object when the position of the object around the moving body cannot be calculated from the detection result of the distance measuring sensor.

BRIEF DESCRIPTION OF THE DRAWINGS

In the accompanying drawings.

DETAILED DESCRIPTION OF THE PREFERRED EMBODIMENTS

Figure 1:
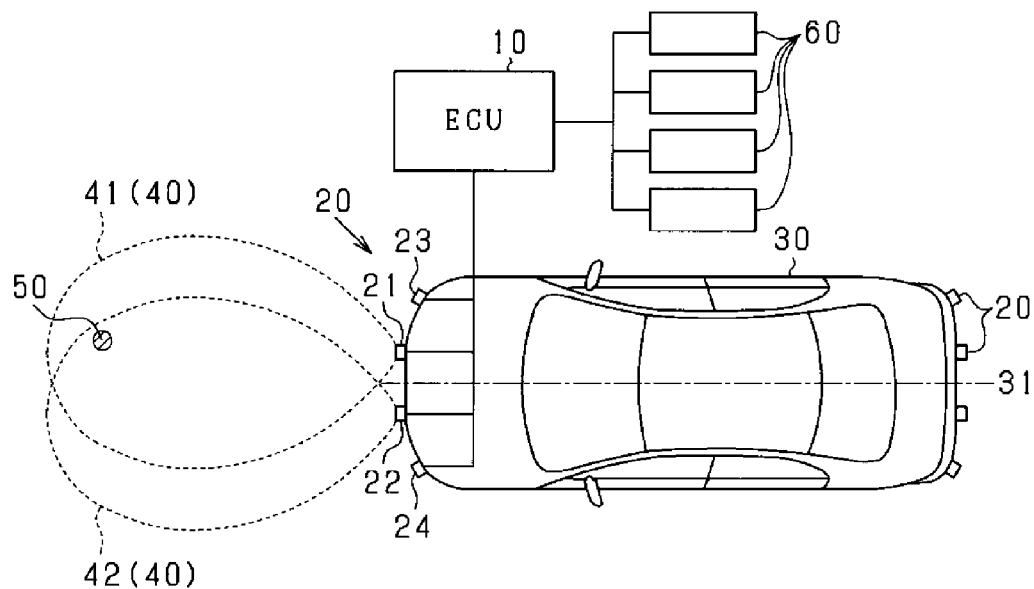
FIG. 1 shows an outline of an object detecting apparatus.

Hereinafter, embodiments will be described with reference to the drawings.

It should be appreciated that, in the following embodiments, components identical with or similar to each other are given the same reference numerals, and repeated structures and features thereof will not be described in order to avoid redundant explanation.

First Embodiment

Hereinafter, a first embodiment embodying an object detecting apparatus mounted on a moving body will be described with reference to the drawings.

An object detecting apparatus according to the present embodiment is a vehicle-mounted apparatus mounted in a vehicle as a moving body, and by receiving detected information of an object from a distance measuring sensor, the object detecting apparatus detects objects such as other vehicles or road structures existing around the vehicle.

First, a general structure of an object detecting system of a vehicle according to the present embodiment will be described with reference to FIG. 1.

A distance measuring sensor 20 is, for example, an ultrasonic sensor having a function of transmitting ultrasonic waves of 20~100 kHz as probe waves, and a function of receiving probe waves reflected from an object as a reflected wave.

In the present embodiment, four distance measuring sensors 20 are mounted at a predetermined distance on a front of the vehicle (e.g., front bumper) so as to aligned in a direction perpendicular to a traveling direction of a vehicle 30 (i.e., vehicle width direction).

Specifically, the distance measuring sensors 20 include two center sensors (first sensor 21, second sensor 22) attached to positions in a vicinity of a center line 31 of the vehicle 30 symmetrically relative to the center line 31, and corner sensors 23, 24 attached respectively to a left corner and a right corner of the vehicle 30.

It should be noted that although the distance measuring sensors 20 are also attached on a rear of the vehicle (e.g., rear bumper) of the vehicle 30, attaching positions and functions of the sensors are the same as the distance measuring sensors 20 of the front of the vehicle, thus the description thereof will be omitted.

In each of the distance measuring sensor 20, an object detection range 40 is set as an area from which it is possible to receive a reflected wave (direct wave) of the self-transmitted probe waves.

Moreover, the distance measuring sensors 20 are disposed so that parts of the object detection ranges 40 of the adjoining two distance measuring sensors 20 overlap.

Although only the object detection ranges 41, 42 of the first and the second sensors 21 and 22 are shown in FIG. 1, the object detection ranges 40 are set similarly for the corner sensors 23, 24.

A threshold value of amplitude of the reflected wave is set to the distance measuring sensor 20, and when the distance measuring sensor 20 receives the reflected wave with the amplitude more than the threshold value, detected information including a receiving time of the reflected wave is transmitted to an ECU 10 which function as the object detecting apparatus.

The ECU 10 is composed mainly of a microcomputer composed of a CPU and various types of memories, and detects a presence or absence of an object 50 around the vehicle based on the detected information of the object 50 that has been received from the distance measuring sensor 20.

Specifically, the ECU 10 transmits a control signal to the distance measuring sensor 20, and commands the distance measuring sensor 20 to transmit probe waves for each transmitting opportunity at a predetermined time interval (for example, several hundred milliseconds interval).

Moreover, when the ECU 10 receives the detected information of the object 50 from the distance measuring sensor 20, the ECU 10 determines the presence or absence of the object 50 around the vehicle based on the received detected information.

Then, when it is determined that the object 50 exists around the vehicle, a steering angle control or deceleration control of the vehicle 30 as a contact avoidance control is performed, or a notification by alarm sound to a driver of the vehicle 30 is performed so that the vehicle 30 does not contact the object 50.

The ECU 10 calculates a relative position (coordinates) of the object 50 with respect to the vehicle 30 by utilizing the principle of triangulation using the detected information of the object 50 inputted from the distance measuring sensor 20.

The principle of triangulation is to calculate coordinates of a measuring point using a distance between known two points and a distance between the respective measuring points of the known two points, as is well known.

According to this principle, the ECU 10 calculates the position (coordinates) of the object 50 by using a distance between the two distance measuring sensors 20 of which the object detection ranges 40 overlap, and a distance between the object 50 and each of the distance measuring sensor 20.

In addition, the vehicle 30 is provided with wheel speed sensors 60 that are rotation detection sensors that detect rotational speed of four wheels (not shown) respectively by detecting the number of rotations per unit time.

The rotational speed of the wheels that the wheel speed sensors 60 detect is inputted to the ECU 10.

A vehicle speed (traveling speed of the vehicle) is calculated by using the rotational speed of the wheels that the wheel speed sensors 60 detect in the present embodiment.

For example, the rotational speed of each wheel is obtained, and the vehicle speed is calculated by using a second smallest (i.e., second slowest) rotational speed.

Moreover, the vehicle speed may be calculated also by acquiring the rotational speed of each wheel and using an average value thereof.

Incidentally, the vehicle speed obtained by the rotational speed of the wheel is obtained after passing through a low pass filter.

This is because that the position of the object 50 used for calculating the relative speed uses a position stored in the memory before the time that the vehicle speed was detected, thus the relative speed with respect to the vehicle speed is delayed.

Figure 2:
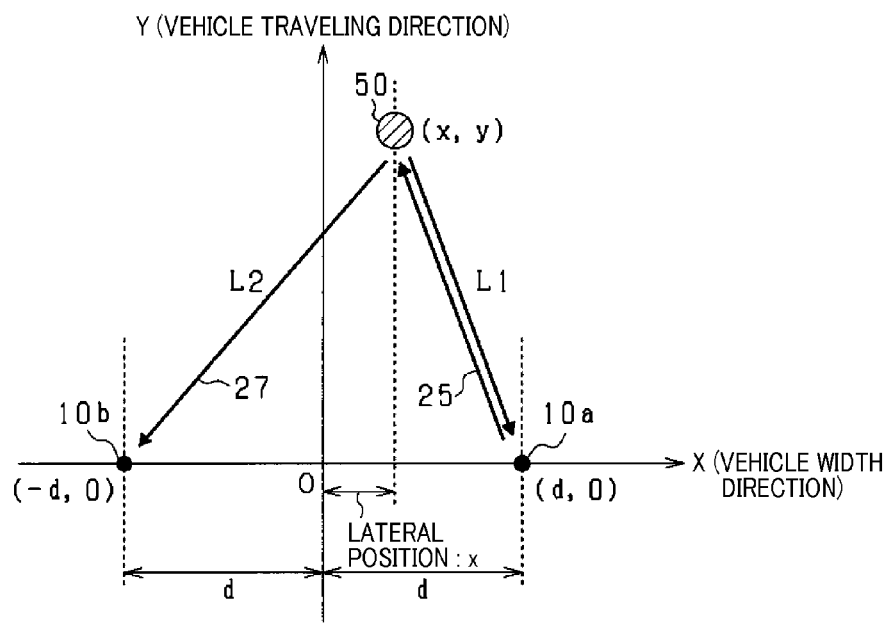
FIG. 2 shows a principle of calculating a position of an object.

FIG. 2 is a diagram for explaining a method of calculating the position of the object 50, and represents the first and second sensors 21, 22, and the object 50 positioned in front of the first and second sensors 21, 22 in a plan view.

It should be noted that in FIG. 2, the first sensor 21 is configured as a direct detection sensor that receives a direct wave 26 by sending probe waves 25, and the second sensor 22 is configured as an indirect detection sensor that receives a reflected wave of probe waves 25 transmitted by the first sensor 21 as an indirect wave 27.

The ECU 10 sets a coordinate system by defining a straight line that passes through the first and second sensors 21, 22 as an X-axis and defining a straight line that passes through an intermediate portion between the first and second sensors 21, 22 as well as perpendicular to the X-axis as a Y-axis, and the ECU 10 calculates an X coordinate and a Y coordinate of the coordinate system as an estimated position of the object 50.

Specifically, the ECU 10 commands the first sensor 21 to transmit probe waves 25.

Then, when probe waves 25 are reflected and received by the first sensor 21 as the direct wave 26, a distance between the first sensor 21 and the object 50 is calculated based on the direct wave 26.

Further, when the reflected wave of probe waves 25 is received by the second sensor 22 as the indirect wave 27, a distance between the second sensor 22 and the object 50 is calculated based on the received indirect waves 27.

A distance between an origin O, which is an intersection of the X-axis and Y-axis, and the first sensor 21 and a distance between the origin O and the second sensor 22 are equal, and the distance d is stored in advance in the ECU 10.

In addition, the ECU 10 defines the time at which the first sensor 21 receives the direct wave 26 as a first time t1, while the ECU 10 defines the time as a second time t2 by subtracting the time that the first sensor 21 transmitted probe waves 25 from the time that the second sensor 22 received the indirect waves 27.

In this case, a value obtained by multiplying the speed of sound by the first time t1 is two times the value of the distance between the first sensor 21 and the object 50, and a value obtained by multiplying the speed of sound by the second time t2 is the sum of the distance between the first sensor 21 and the object 50 and the distance between the second sensor 22 and the object 50.

The ECU 10 calculates the coordinates (x, y) of the object 50 by triangulation using the distance 2$d$ between the first sensor 21 and second sensor 22, and measured values of the first time t1 and the second time t2.

Although it is described as an example in FIG. 2 that the first sensor 21 is the direct detection sensor and the second sensor 22 is the indirect detection sensor, the position of the object 50 is similarly calculated when the first sensor 21 is an indirect detection sensor and the second sensor 22 is a direct detection sensor.

In addition, among the four sensors 21-24, the position of the object 50 is calculated in every combination of the two adjoining sensors.

Likewise, in the distance measuring sensors 20 in the rear of the vehicle, the position of the object 50 is calculated using every combination of the two adjoining sensors.

It should be noted that when the object 50 is a stationary object, the relative position between the vehicle 30 and the object 50 changes following the movement of the vehicle 30, and when the object 50 is a moving object, the relative position between the vehicle 30 and the object 50 changes following the movement of the vehicle 30 and the movement of the object 50.

Figure 3A:
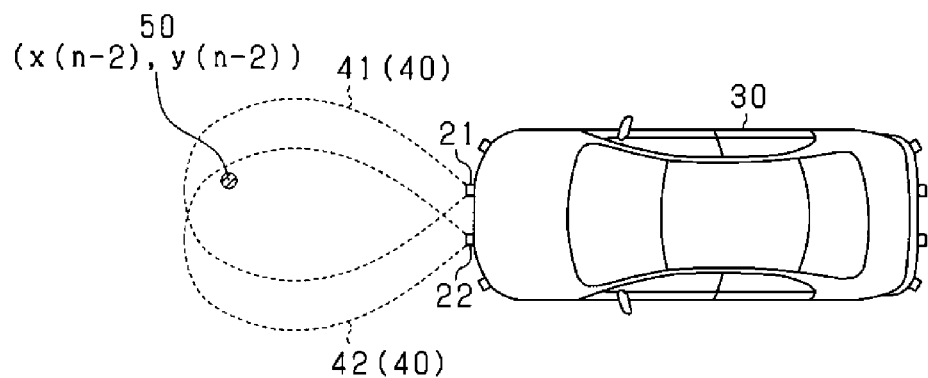
FIGS. 3A, 3B and 3C show a change of a relative position following a movement of a vehicle and the object.
Figure 3B:
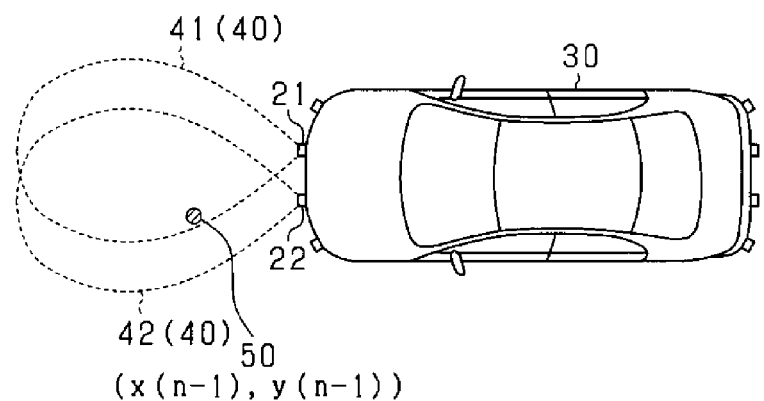
Figure 3C:
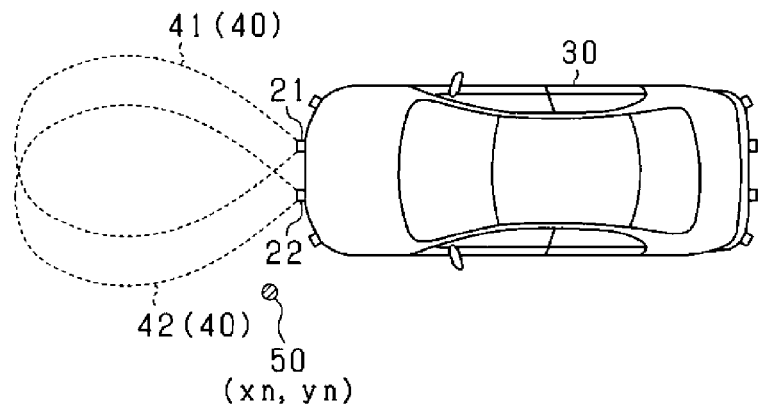

FIGS. 3A, 3B and 3C show an example of a relative position between the vehicle 30 and the object 50 changing following the movement of the vehicle 30.

FIGS. 3A, 3B and 3C show an example where the object 50 is a moving object, and a time series is in the order of FIG. 3A, FIG. 3B, and FIG. 3C.

In FIG. 3C, the position of the object 50 is outside the object detection range 40, and the coordinates (xn, yn) of the object 50 shown in FIG. 3C are set to a current position to be estimated.

Even if the object 50 is a stationary object, the relative positional relationship between the vehicle 30 and the object 50 changes following the movement of the vehicle 30 in the same manner.

As shown in FIGS. 3A, 3B and 3C, as time passes by, it may happen that the position of the object 50 moves from inside the object detection range 40 of the distance measuring sensor 20 to outside the object detection range 40.

Then, due to the position of the object 50 moving to outside the object detection range 40, the position calculation of the object 50 becomes impossible.

At this time, a possibility arises that the vehicle 30 and the object 50 are in contact with each other depending on the form and position of the object 50.

Therefore, in the present embodiment, the position of the object 50 is estimated after the object 50 moves from inside the object detection range 40 of the distance measuring sensor 20 to outside the object detection range 40, and a contact avoidance control is performed using the estimated position of the object 50.

A method of estimating a position of the object 50 that has moved from inside the object detection range 40 to outside the object detection range 40 will be explained.

Here, first, a position estimating method performed by using a distance moved (moving distance) of the vehicle 30 calculated by distance-converting the vehicle speed after the position of the object 50 becomes impossible to calculate will be described.

In such a method, the position of the object 50 is estimated by using a last known position of the object 50, and the distance moved by the vehicle 30 that is calculated based on a last known vehicle speed (corresponding to a first estimator).

Incidentally, as described above, the vehicle speed is calculated by using the rotational speed of the wheel that the wheel speed sensor 60 has detected.

In this case, it is preferable that the calculated position of the object 50 is successively stored in the memory as a position history when the object 50 is present within the object detection range 40, and when the object 50 moves to outside of the object detection range 40, it is preferable to perform a subsequent position estimation by using the position history of the object 50.

In the present embodiment, as another position estimating methods, the position of an object 50 is estimated based on a last known position of the object 50, and a last known relative speed of the vehicle 30 and the object 50 (corresponding to a second estimator).

In this case, the relative speed of the vehicle 30 and the object 50 is calculated based on the change in position of the object 50 when the object 50 is present within the object detection range 40, and the information of the relative speed is successively stored in the memory.

To provide an additional explanation to the calculation of the relative speed, for example, the coordinates of the object 50 (x (n−2), y (n−2)) shown in FIG. 3A is subtracted from the coordinates of the object 50 (x (n−1), y (n−1)) shown in FIG. 3B.

Then, the relative speed between the vehicle 30 and the object 50 can be obtained by dividing the above result by a difference between the time that the coordinates (x (n−1), y (n−1)) has been detected and the time that the coordinates (x (n−2), y (n−2)) has been detected.

When calculating the relative speed, it is preferable to calculate the relative speed as a vector corresponding to an absolute value of the speed and moving directions of x and y.

However, as described above, when the position calculation of the object 50 is impossible, an accuracy of the position estimating of the object 50 lowers in the method of estimating the position of the object 50 from the immediate position of the object 50 and the distance moved by the vehicle 30 if the distance moved by the vehicle 30 is not properly obtained.

For example, in a relation between the vehicle 30 and the object 50, a case that the object 50 is a stationary object, and a case that the object 50 is a moving object are both possible. In the case of that the object 50 is a stationary object, it is possible to calculate the distance moved by the vehicle 30 by distance-converting the vehicle speed, while in the case of that the object 50 is a moving object, it is impossible to calculate the distance moved by the vehicle 30 by distance-converting the vehicle speed.

That is, if the object 50 is a stationary object, it is possible to estimate the position of the object 50 by using the vehicle speed as long as the vehicle speed is known even when the position of the object 50 is out of the object detection range 40.

In other words, the relative position of the object 50 with respect to the vehicle 30 varies depending only on the distance moved by the vehicle 30.

Therefore, the current position of the object 50 shown in FIG. 3C can be estimated by using the previously detected coordinates and the vehicle speed.

In contrast, if the object 50 is a moving object, it is impossible to estimate the current position of the object 50 shown in FIG. 3C by using the previously detected coordinates and the vehicle speed because the relative position of the object 50 with respect to the vehicle 30 does not depend only on the distance moved by the vehicle 30.

Therefore, if the object 50 is a moving object, when the position calculation of the object 50 becomes impossible, the position of the object 50 is estimated based on the last know position of the object 50 (position history) and the relative speed (relative speed history) between the vehicle 30 and the object 50.

It is preferable that determining whether the object 50 is a stationary object or a moving object is performed by using the relative speed between the vehicle 30 and the object 50.

That is, dividing the relative speed by the vehicle speed of the vehicle 30, and if a value obtained can be approximated to 1, the object 50 can be determined to be a stationary object.

In addition, a situation where the distance moved by the vehicle 30 cannot be determined correctly, a situation that a vehicle speed is not a normal value when calculating the vehicle speed by using the rotational speed of the wheel detected by the wheel speed sensor 60 may be considered.

For example, if a slip (lock) occurs to one of the wheels while the vehicle 30 is traveling, despite the rotational speed that the wheel speed sensor 60 detects is zero, it is considered that the vehicle 30 continues to move while slipping, and the detected value of the vehicle speed in such a case will be different from the normal values.

Therefore, in the present embodiment, it is determined whether the vehicle speed has been correctly calculated, and the position estimating method of the object 50 is selectively employed based on the determined result.

In this case, when the second smallest rotational speed has been used among the rotational speeds of the wheels, the vehicle speed cannot be calculated correctly if two or more wheels are locked.

Therefore, it is determined that it is in a condition that the vehicle speed cannot be correctly calculated in a case where a wheel speed of two or three wheels among the four is zero and the remaining wheel speed is not zero.

Further, when calculating the speed using the average value of the rotational speeds of the wheels, the vehicle speed cannot be calculated correctly if one or more wheels is/are locked.

In this case, it is determined that the vehicle is in a condition where the vehicle speed cannot be correctly calculated in a case where a wheel speed of at least one wheel is zero, and a wheel speed of at least one wheel is not zero.

Figure 4:
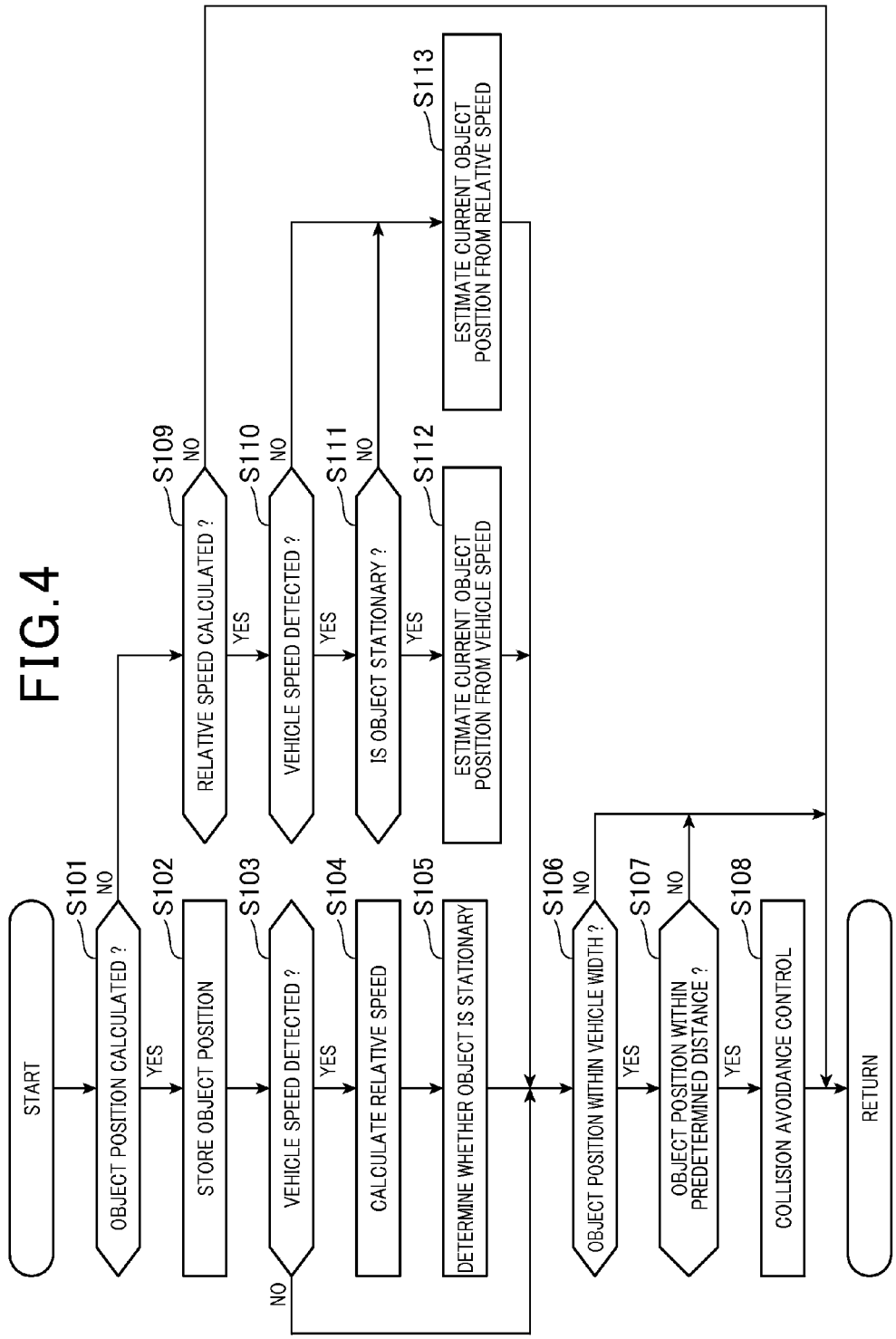
FIG. 4 shows a flowchart of processes that the object detecting apparatus executes.

FIG. 4 is a flowchart showing a flow of a series of processes that the ECU 10 executes.

The processes according to the flowchart in FIG. 4 are performed after a calculation of the position of the object 50 using the detection result by the distance measuring sensor 20 is performed.

First, the ECU 10 functions as the position calculator while determines whether or not the position of the object 50 is calculated (S101).

Specifically, if the object 50 is present within the object detection range 40, S101 is determined to be affirmative should be performed, i.e., the position calculation of the object 50 has been performed.

On the other hand, if the object 50 is not present in the object detection range 40, the position calculation of the object 50 becomes impossible and thus S101 is determined to be negative.

In this case, the ECU 10 functions as a first determiner.

If the position of the object 50 has been determined to be calculated (S101: YES), its position is stored in the memory (S102), and the ECU 10 functions as a speed detector while determining whether the vehicle speed is being correctly detected (S103).

If the vehicle speed is detected (S103: YES), the ECU 10 functions as a relative speed calculator, and calculates the relative speed between the vehicle 30 and the object 50 based on the calculated position of the object 50 and the detected vehicle speed, and stores the result in the memory (S104).

Then, it is determined whether the object 50 is a stationary object, and the determined result is stored in the memory (S105).

It should be noted that since it is impossible to calculate the relative speed if the vehicle speed is not detected, the processes of S104 and S105 are omitted in this control cycle (S103: NO).

Then, it is determined whether or not that the current position of the object 50 is within a vehicle width (S106).

In the process of S106, it is determined whether or not the X coordinate, which is a coordinate of the object 50 in the vehicle width direction, is within the vehicle width.

Since there is no risk of contact between the vehicle 30 and the object 50 if the present position of the object 50 is not determined to be within the vehicle width (S106: NO), the series of processes ends.

On the other hand, when it is determined that the current position of the object 50 is within the vehicle width, then it is determined whether or not the current position of the object 50 is within a predetermined distance from the vehicle 30 (S107).

In S107, the distance between the front end of the vehicle 30 and the object 50 is calculated by using a Y coordinate, which is a coordinate of the object 50 in the traveling direction of the vehicle 30.

Then, it is determined whether the distance is within the predetermined distance that is set in advance.

The predetermined distance may be changed according to the vehicle speed, or when the vehicle speed is not detected, a predetermined value set in advance may be used.

Then, when the current position of the object 50 is not determined to be within the predetermined distance from the vehicle 30 (S107: NO), the series of processes ends.

On the other hand, when the current position of the object 50 is determined to be within the predetermined distance from the vehicle 30 (S107: YES), since the possibility arises that the vehicle 30 may contact with the object 50 by the movement of the vehicle 30, the vehicle 30 performs collision avoidance control such as the braking control (S108), and the series of processes ends.

Next, a case when it is determined that it has failed to calculate the position of the object 50 (S101: NO) will be described.

First, in S104 in the previous control cycle, it is determined whether the relative speed between the vehicle 30 and the object 50 has already been calculated, and it has already been determined whether the object 50 is a stationary object (S109).

If the relative speed between the vehicle 30 and the object 50 has not been calculated (S109: NO), since it is not possible to estimate the current position of the object 50, the series of processes ends.

On the other hand, if the relative speed between the vehicle 30 and the object 50 has already been calculated, and if it is already determined whether the object 50 is a stationary object, the ECU 10 functions as a speed determiner, and determines whether the vehicle speed is detected (S110).

If it is determined that the vehicle speed is detected (S110: YES), the ECU 10 functions as an object determiner, and determines whether the object 50 is a stationary object (S111).

In S110 and S111, the ECU 10 functions as a second determiner, and when S110 and S111 are both YES, it means that the distance moved by the vehicle 30 can be calculated.

A process of S111 is performed using the determined results stored in the memory in the process of S105.

It may be determined whether the object 50 is a moving object instead of the process of S111.

When S110 and S111 are both YES, the position of the object 50 stored in the memory in S102 is read out, and from the read out position, the ECU 10 functions as a displacement calculator, and the current position of the object 50 is estimated by calculating the distance moved by the vehicle 30 that is calculated based on the vehicle speed (S112).

Moreover, if any one of S110 or S111 is NO, the position stored in the memory in S102 and the relative speed stored in the memory in S104 are read out, and the current position of the object 50 is estimated using the position and relative speed of the object (S113).

At this time, it is assumed that from the time it is stored in the memory, the relative speed between the vehicle 30 and the object 50 is not changed, and the distance moved is calculated from the position of the object 50 by calculating the distance moved from the relative speed.

Incidentally, the ECU 10 functions as the first estimator in S112, and functions as the second estimator in S113.

When the current position of the object 50 is estimated in S112 or S113, the same processes as the processes of S106 to S108 for calculating the position of the object 50 are executed, and the series of processes ends.

With the above structure, the object detecting apparatus according to the embodiment has the following effects.

If the position of the object 50 cannot be detected and if the distance moved by the vehicle 30 cannot be accurately calculate, the position of the object 50 is estimated by using the previously calculated position of the object 50 and the relative speed between the vehicle 30 and the object 50.

Therefore, even when it is not possible to correctly calculate the distance moved by the vehicle 30 like when the object 50 is a moving object or the wheel is locked, it is possible to estimate the position of the object 50, and it is possible to avoid a situation of the contact avoidance control being not performed despite there being a possibility that the object 50 may exist in the traveling direction of the vehicle 30.

When estimating the position of the object 50 by using the relative speed between the object 50 and the vehicle 30, the detection accuracy of the position of the object 50 is lowered when the speed of the vehicle 30 is changed.

In this respect, when the object 50 is a stationary object, since the position of the object 50 is estimated based on the previous position and the vehicle speed of the object 50, it allows the estimation of the position of the object 50 when the object 50 is a moving object and when the vehicle speed cannot be detected, while it is possible to improve the estimating accuracy of the position of the object 50 when the object 50 is a stationary object.

<Modification>

If the position calculation of the object 50 based on the detection result of the distance measuring sensor 20 becomes impossible, although it is configured to perform the respective determination process of S110 and S111 in the processes of FIG. 4, this may be changed, and it may be configured to perform either one of S110 or S111.

Although the wheel speed sensors 60 is provided in each wheel of the vehicle 30, and it is configured that the vehicle speed is detected based on the detection result of each of these wheel speed sensors 60 in the above embodiment, this configuration may be changed.

For example, the wheel speed sensor 60 may be provided in at least two wheels out of the four wheels of the vehicle 30.

In addition, it may be configured to detect the vehicle speed based on a detection result of a rotational speed sensor provided on an output shaft of a transmission.

A method of determining whether the object 50 is a stationary object or a moving object may be arbitrary, and in addition to the above, it is also possible to determine whether the object 50 a stationary object or a moving object by using captured images of an on-board camera.

Although the above embodiment has exemplified one using ultrasonic waves as probe waves, it is possible to use waves other than ultrasonic waves, for example, sound waves or radio waves as probe waves.

Although an object detecting apparatus is intended to be mounted on a vehicle 30 in the above embodiments, an object to be equipped with may be a moving object other than a vehicle, such as airplanes, ships, robots or the like.

Methods of calculating speeds in these cases can employ methods of calculating speeds that are generally used in each moving object.

Although the two-dimensional relative position between the vehicle 30 and the object 50 is calculated by triangulation using a plurality of distance measuring sensors 20 in the above embodiment, the present disclosure can be applied in the same manner for calculating a one-dimensional relationship of the position between the vehicle 30 and the object 50, that is, in the case of calculating the distance only.

What is claimed is:

1. An object detecting apparatus that detects an object using a distance measuring sensor and is mounted in a moving body, comprising:
   a position calculator that calculates a position of the object relative to the moving body based on a detection result of the distance measuring sensor;
   a speed detector that detects a speed of the moving body;
   a displacement calculator that calculates a distance moved by the moving body based on the speed of the moving body that is detected by the speed detector;
   a relative speed calculator that calculates a relative speed between the moving body and the object based on the position of the object calculated by the position calculator and the speed of the moving body detected by the speed detector;
   a first determiner that determines whether a position calculation in the position calculator is possible;
   a second determiner that determines whether a moved distance calculation by the displacement calculator is possible;
   a first estimator that estimates the position of the object based on a last known position of the object and the distance moved by the moving body calculated by the displacement calculator when the position calculation is determined to be impossible by the first determiner and the moved distance calculation is determined to be possible by the second determiner; and
   a second estimator that estimates the position of the object based on the last known position of the object and a last known relative speed when the position calculation is determined to be impossible by the first determiner and the moved distance calculation is determined to be impossible by the second determiner.

2. The object detecting apparatus according to claim 1, wherein,
   the object detecting apparatus further comprises an object determiner that determines whether the object is either a stationary object or a moving object;
   the second determiner determines that the moved distance calculation by the displacement calculator is possible when the object is determined to be a stationary object; and
   the second determiner determines that the moved distance calculation by the displacement calculator is not possible when the object is determined to be a moving object.

3. The object detecting apparatus according to claim 2, wherein,
   the object determiner determines whether the object is a stationary object or a moving object based on a value obtained by dividing the relative speed calculated by the relative speed calculator by the speed of a moving object.

4. The object detecting apparatus according to claim 1, wherein,
   the object detecting apparatus further comprises a speed determiner that determines whether the speed of the moving body detected by the speed detector is a normal value;
   the second determiner determines that the moved distance calculation by the displacement calculator is possible when the speed of a moving object is determined to be the normal value; and
   the second determiner determines that the moved distance calculation by the displacement calculator is not possible when the speed of a moving object is determined to be not the normal value.

5. The object detecting apparatus according to claim 4, wherein,
   the moving body is a vehicle having a plurality of wheels;
   the object detecting apparatus further comprises rotation detecting sensors that detect a respective rotational speed of two or more wheels among the plurality of wheels;
   the speed detector detects a traveling speed of the vehicle based on detection results of the two or more rotation detecting sensors; and
   the speed determiner determines that the traveling speed of the vehicle is not a normal value as the speed of the moving body when it is determined that a slip of the wheel is occurred from the detection results of the two or more rotation detecting sensors.

* * * * *